US012668076B2

(12) United States Patent
Rosset et al.

(10) Patent No.: US 12,668,076 B2
(45) Date of Patent: Jun. 30, 2026

(54) OPTICAL STRUCTURE HAVING A RELIEF EFFECT

(71) Applicant: OBERTHUR FIDUCIAIRE SAS, Paris (FR)

(72) Inventors: Henri Rosset, Le Pin (FR); Philippe Dietemann, Saint Martin d'Heres (FR); Aurélie Maman, Chasselay (FR)

(73) Assignee: OBERTHUR FIDUCIAIRE SAS, Paris (FR)

( * ) Notice: Subject to any disclaimer, the term of this patent is extended or adjusted under 35 U.S.C. 154(b) by 0 days.

(21) Appl. No.: 17/786,392

(22) PCT Filed: Dec. 18, 2020

(86) PCT No.: PCT/EP2020/087035

§ 371 (c)(1),
(2) Date: Jun. 16, 2022

(87) PCT Pub. No.: WO2021/123177

PCT Pub. Date: Jun. 24, 2021

(65) Prior Publication Data

US 2023/0356541 A1 Nov. 9, 2023

(30) Foreign Application Priority Data

Dec. 20, 2019 (FR) ...................................... 1915373

(51) Int. Cl.
*B42D 25/324* (2014.01)
*B42D 25/21* (2014.01)
(Continued)

(52) U.S. Cl.
CPC ........... *B42D 25/364* (2014.10); *B42D 25/21* (2014.10); *B42D 25/324* (2014.10);
(Continued)

(58) Field of Classification Search
CPC ... B42D 25/324; B42D 25/364; G09F 1/1337; G09F 1/133711
See application file for complete search history.

(56) References Cited

U.S. PATENT DOCUMENTS 7,929,124 B2 4/2011 Schuetzmann et al.
2006/0023132 A1* 2/2006 Mengel ................ B42D 25/391 349/20

(Continued)

FOREIGN PATENT DOCUMENTS

EP 1894736 A2 * 3/2008 .............. B41M 3/14
EP 2196322 A2 * 6/2010 ............. B42D 25/00

(Continued)

OTHER PUBLICATIONS

EP-2196322-A2 English Translation (Year: 2010).*

(Continued)

*Primary Examiner* — Kyle R Grabowski
(74) *Attorney, Agent, or Firm* — The Marbury Law Group, PLLC

(57) ABSTRACT

The invention relates to an optical structure (5) having a relief effect, comprising: —a support (7) adapted for aligning liquid crystals, —a deposit (9) in contact with the support of a substance in the form of at least one pattern (11), which partially covers the support, and—a liquid crystal layer (13) which at least partially covers the support and said pattern and is in contact with the support.

20 Claims, 12 Drawing Sheets

(51) Int. Cl.

| | |
|---|---|
| ***B42D 25/351*** | (2014.01) |
| ***B42D 25/364*** | (2014.01) |
| ***B42D 25/391*** | (2014.01) |
| ***B42D 25/47*** | (2014.01) |

(52) U.S. Cl.

CPC ......... *B42D 25/351* (2014.10); *B42D 25/391* (2014.10); *B42D 25/47* (2014.10)

(56) References Cited

U.S. PATENT DOCUMENTS

| | | | | |
|---|---|---|---|---|
| 2009/0059158 | A1 | 3/2009 | Umeya et al. | |
| 2010/0141881 | A1* | 6/2010 | Batistatos | B42D 25/29 349/124 |
| 2013/0288024 | A1* | 10/2013 | Clauter | B44F 1/14 428/207 |
| 2018/0093519 | A1 | 4/2018 | Dickerson et al. | |

FOREIGN PATENT DOCUMENTS

| | | | | | |
|---|---|---|---|---|---|
| EP | 2886343 | A1 | | 6/2015 | |
| EP | 2977935 | A1 | | 1/2016 | |
| EP | 3321092 | A1 | | 5/2018 | |
| ES | 2397568 | T3 | * | 3/2013 | G02B 5/3016 |
| GB | 2324382 | A | * | 10/1998 | G02F 1/133719 |
| JP | H06287453 | A | * | 10/1994 | C08G 77/38 |
| JP | 2003145965 | A | | 5/2003 | |
| JP | 2004053870 | A | | 2/2004 | |
| JP | 2006139178 | A | * | 6/2006 | B42D 25/364 |
| JP | 2011022821 | A | | 2/2011 | |
| JP | 2013104141 | A | | 5/2013 | |
| JP | 2014182767 | A | | 9/2014 | |
| WO | 2005/005727 | A1 | | 1/2005 | |
| WO | 2007105721 | A1 | | 9/2007 | |
| WO | WO-2007140887 | A2 | * | 12/2007 | B42D 25/00 |
| WO | WO-2008067932 | A2 | * | 6/2008 | B42D 25/23 |
| WO | WO-2016154668 | A1 | * | 10/2016 | B42D 25/29 |

OTHER PUBLICATIONS

WO-2008067932-A2 English Translation (Year: 2008).*

JP2006139178A English Translation (Year: 2006).*

JP-H06287453-A English Translation (Year: 1994).*

International Search Report and Written Opinion for counterpart Application No. PCT/EP2020/087035, dated Apr. 15, 2021.

Ding et al., "On-Chip Manipulation of Single Microparticles, Cells, and Organisms Using Surface Acoustic Waves," Proc. Nat. Ac. Sci., 2012, 109, pp. 11105-11109.

Tran, et al., "Fast Acoustic Tweezers for the Two-Dimensional Manipulation of Individual Particles in Microfluidic Channels," Applied Physics Letters, American Institute of Physics, 2012, 101, 4 pages.

Notice of Reasons for Refusal in JP2022537875, dated Nov. 12, 2024, 17 pages.

* cited by examiner

[Fig 1]
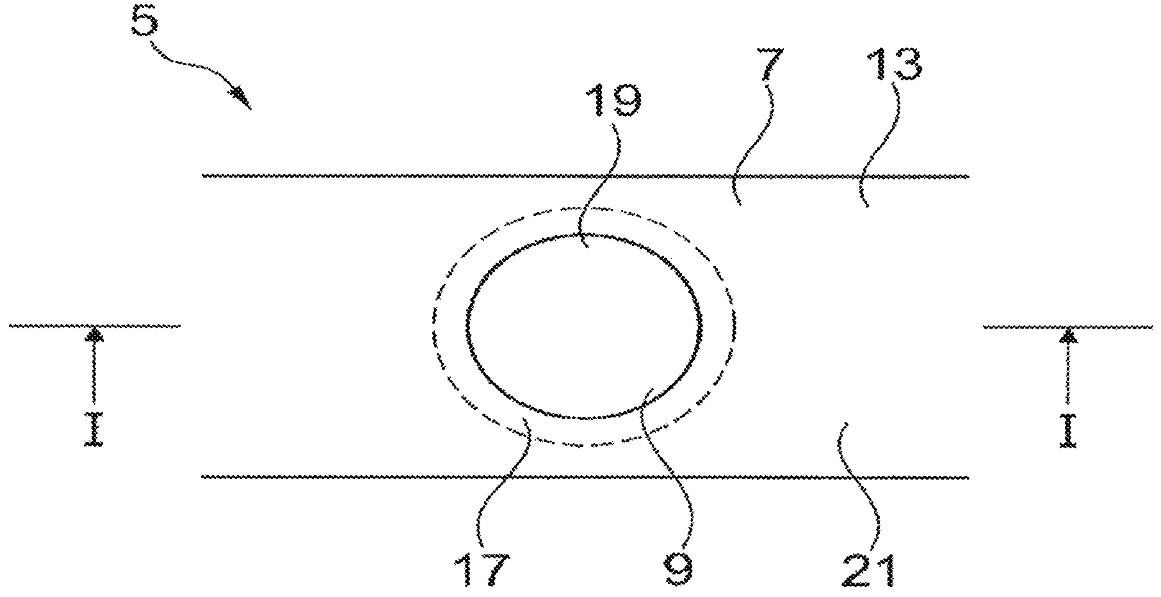
[Fig 2]
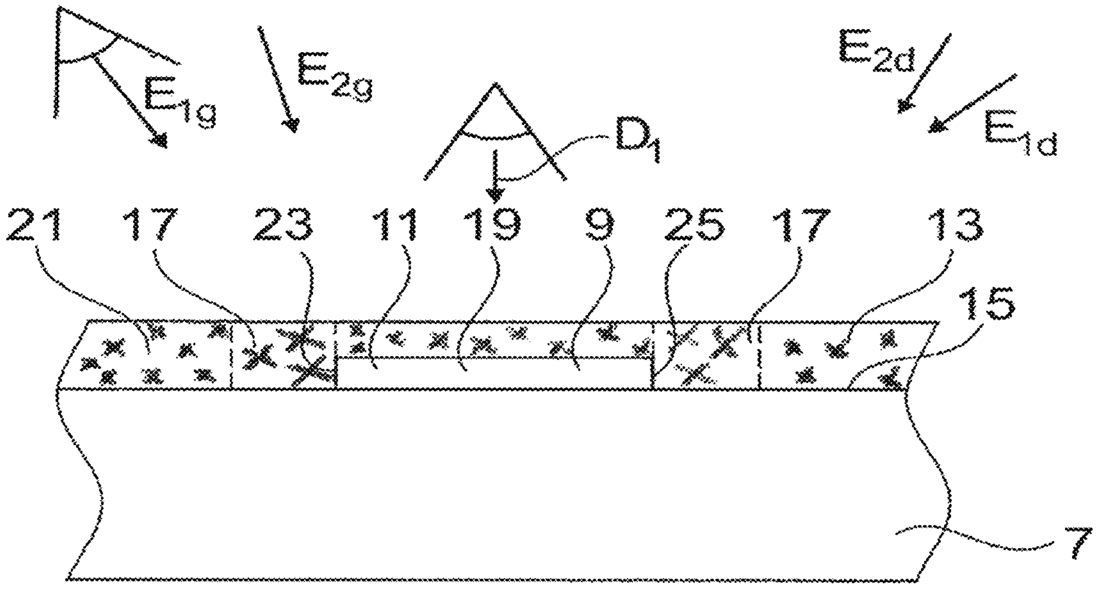

[Fig 3]
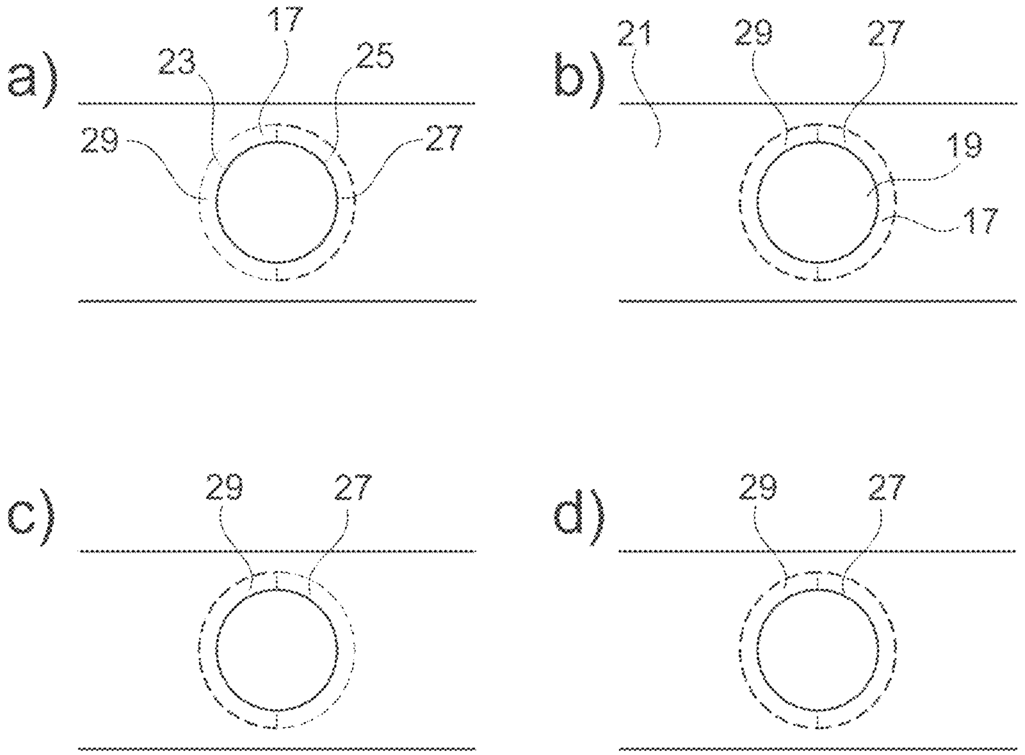
[Fig 4]
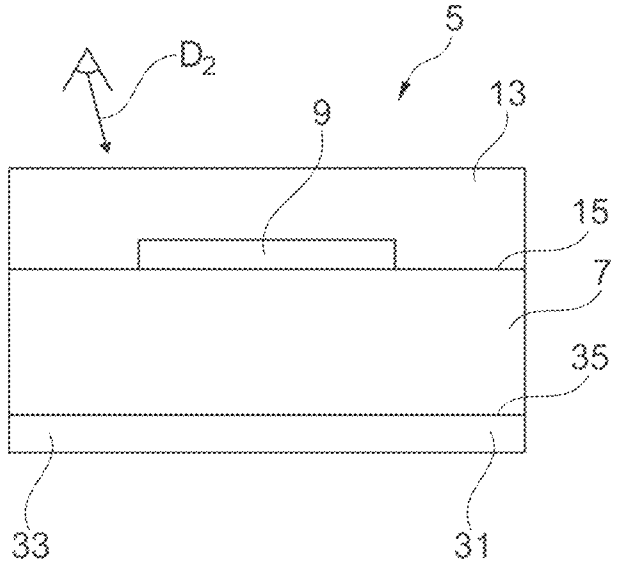

[Fig 5]
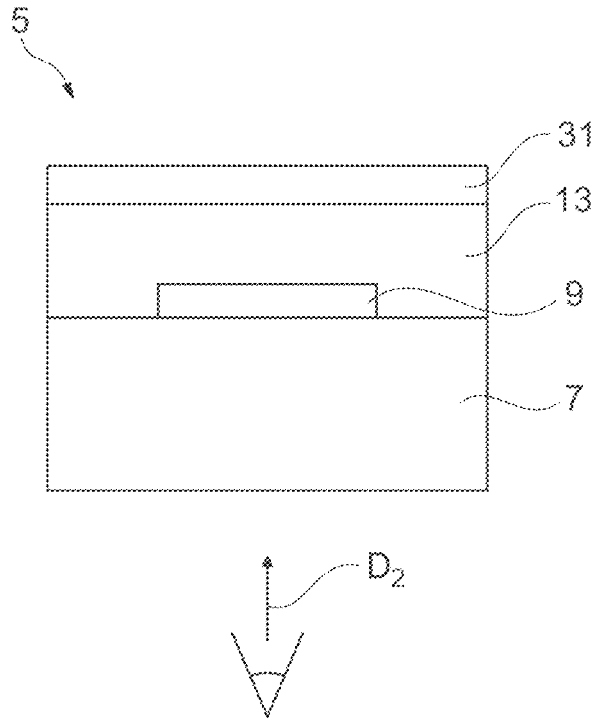
[Fig 6]
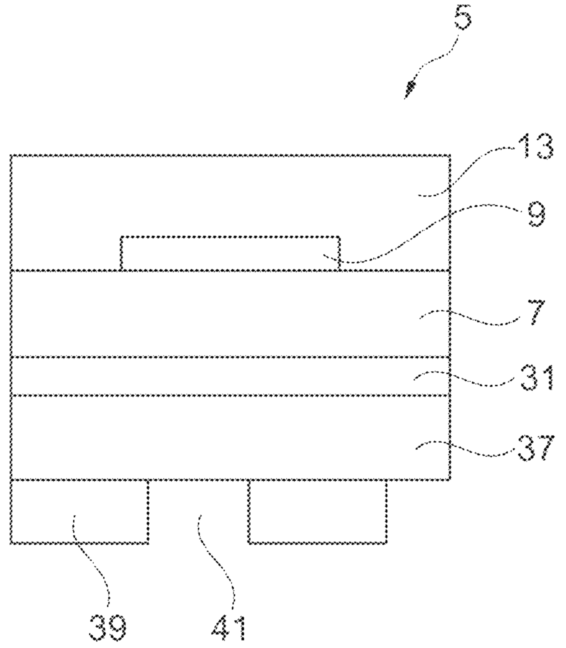

[Fig 7]
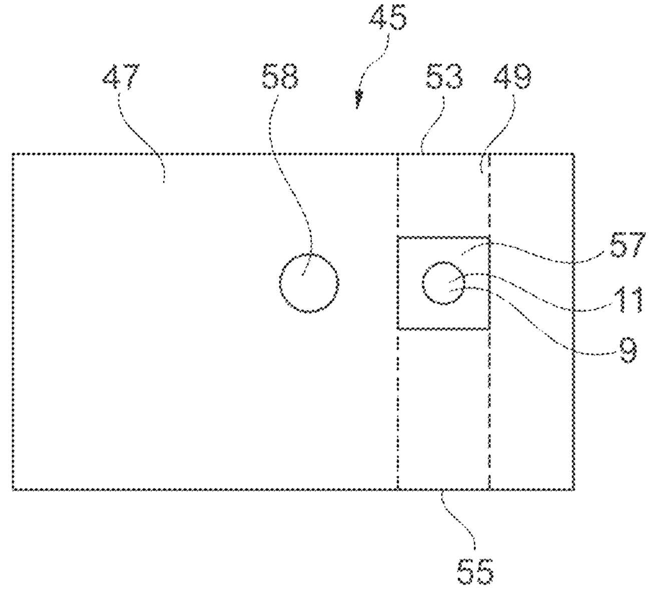
[Fig 8]
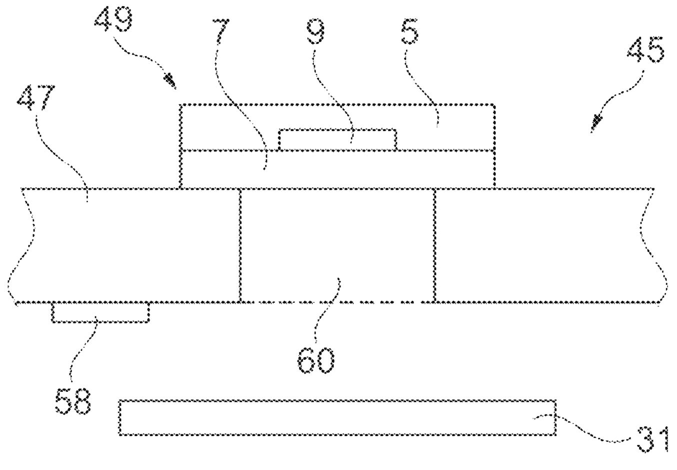

[Fig 9]
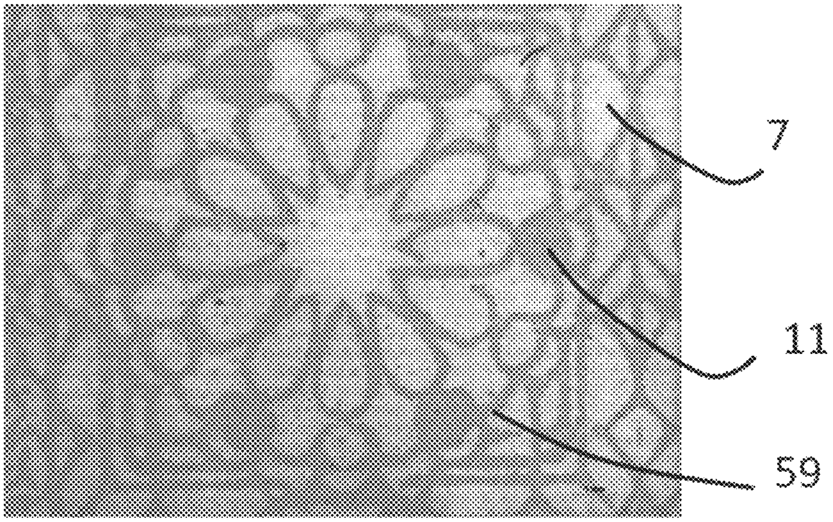
[Fig 10]
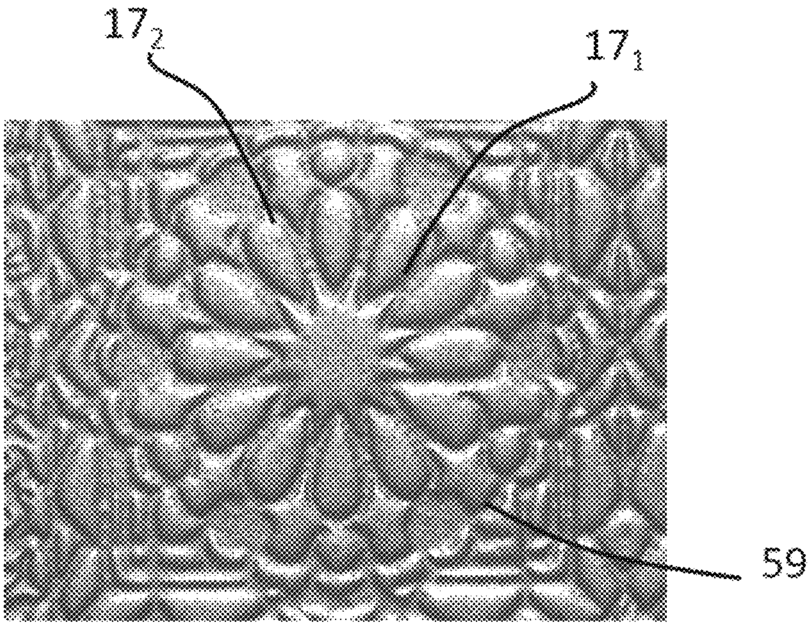

[Fig 11]
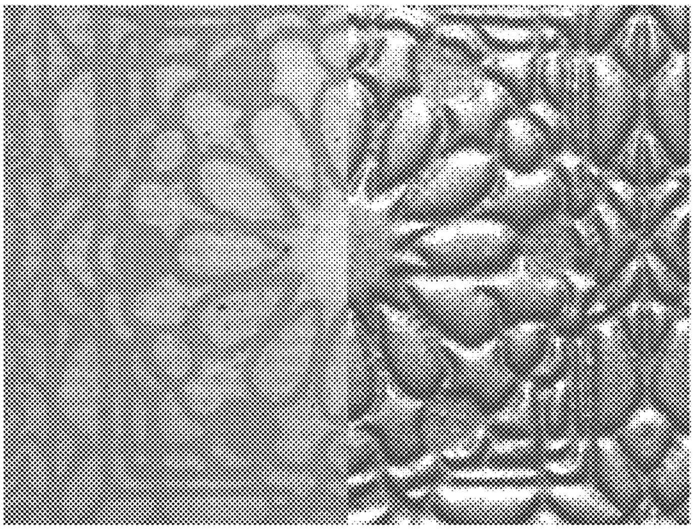
[Fig 12]
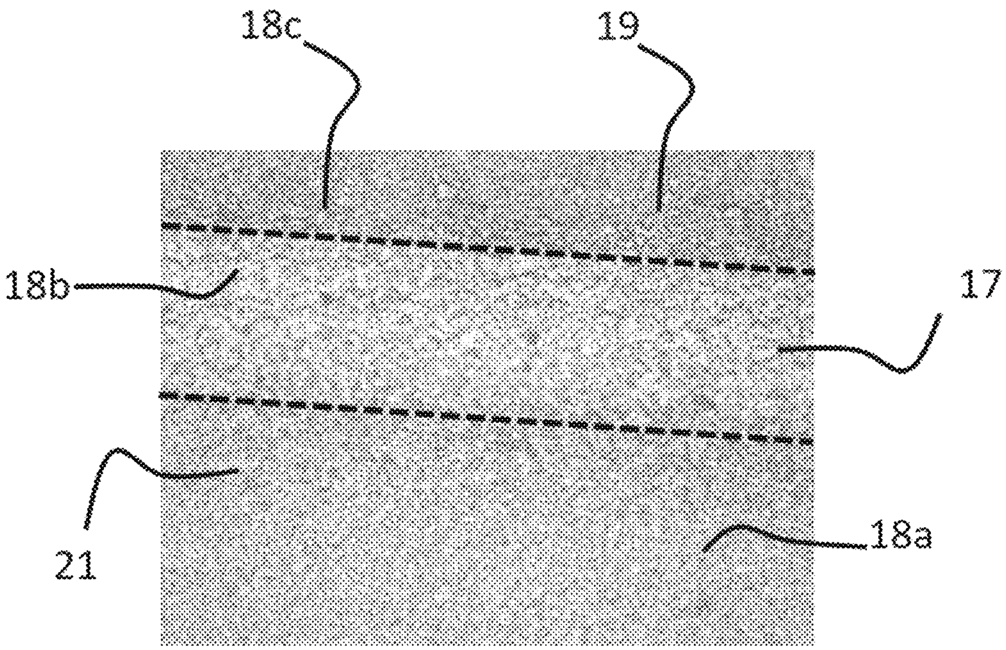

[Fig 13]
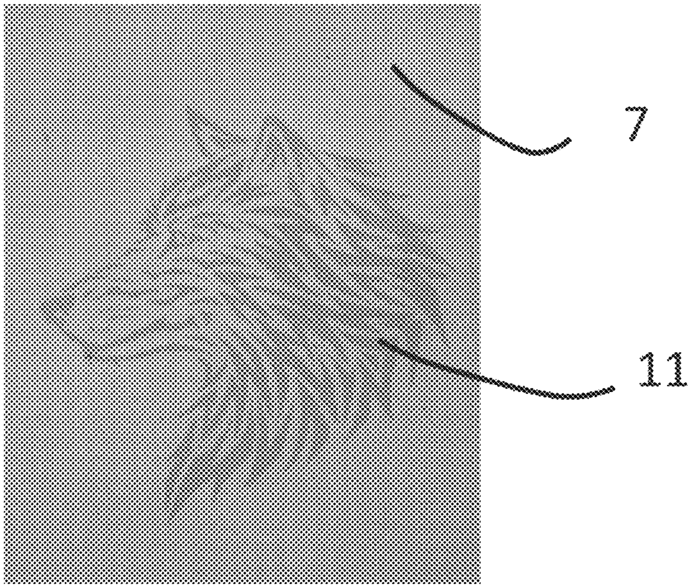
[Fig 14]
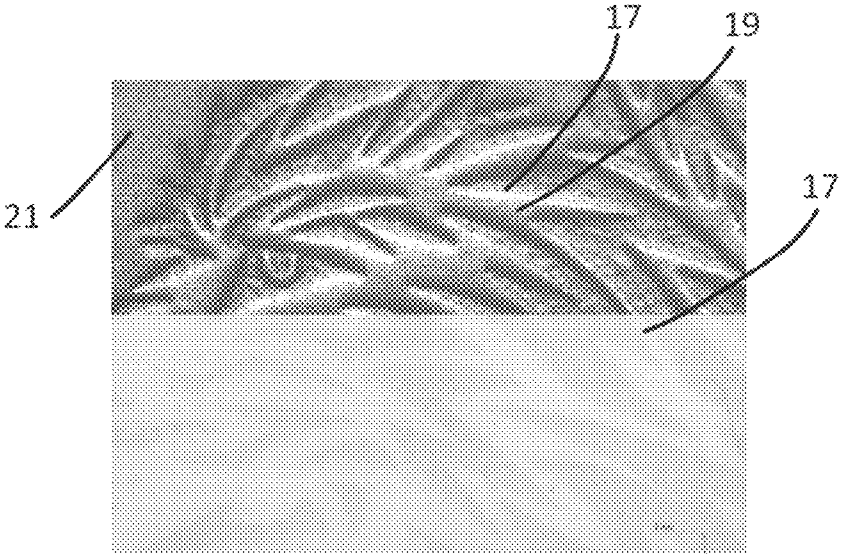

[Fig 15a]
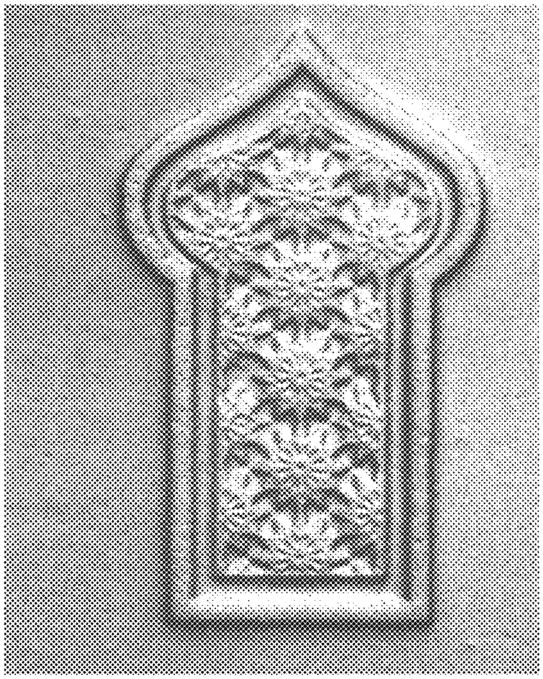
[Fig 15b]
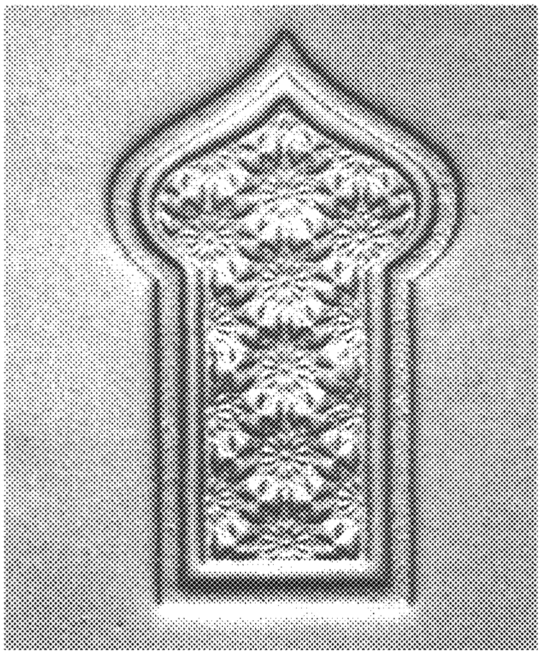

[Fig 16a]
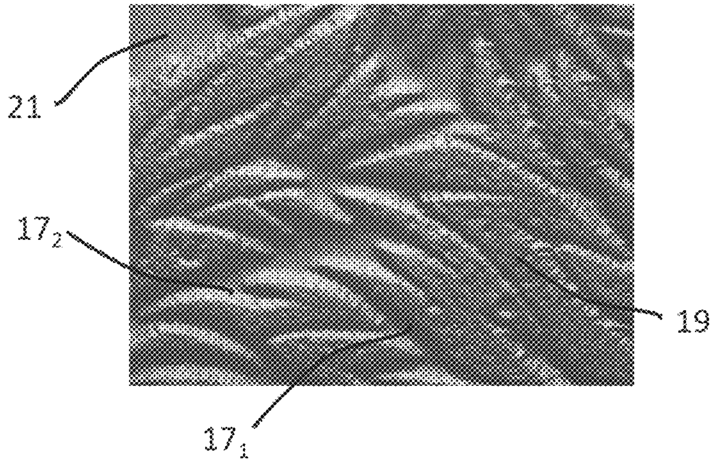
[Fig 16b]
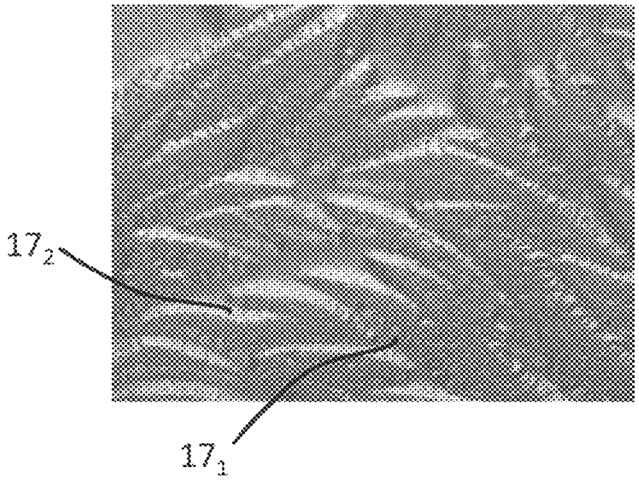

[Fig 16c]
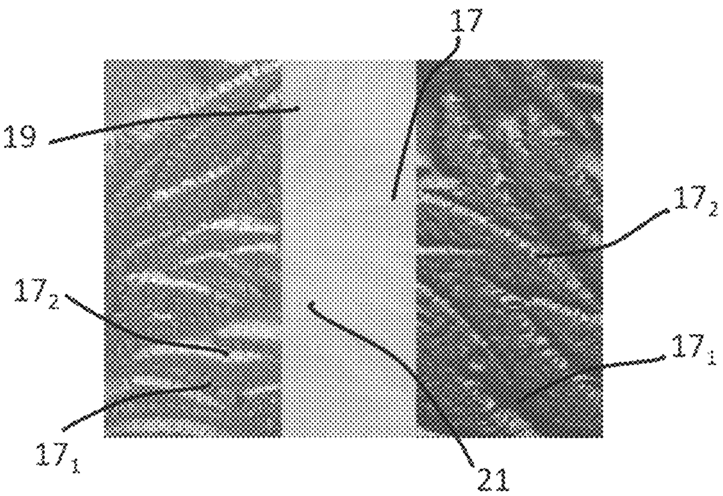
[Fig 17a]
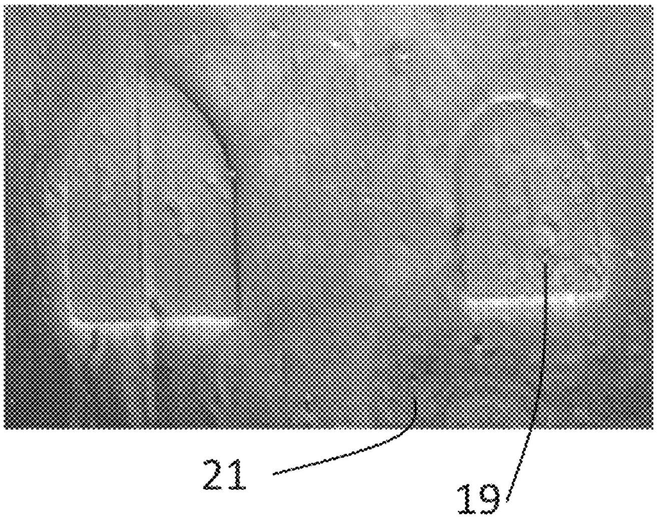

[Fig 17b]
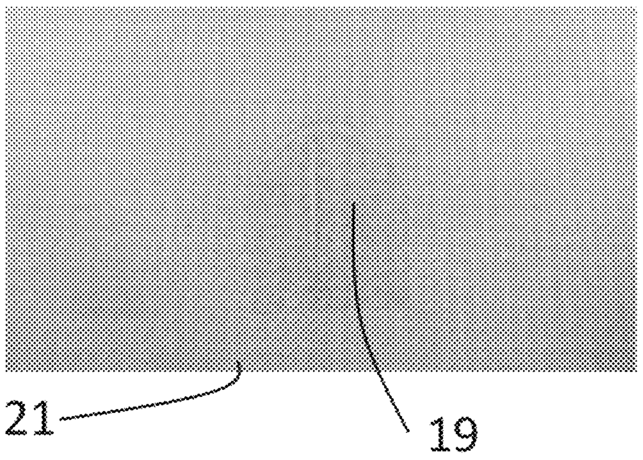

[Fig 17c]
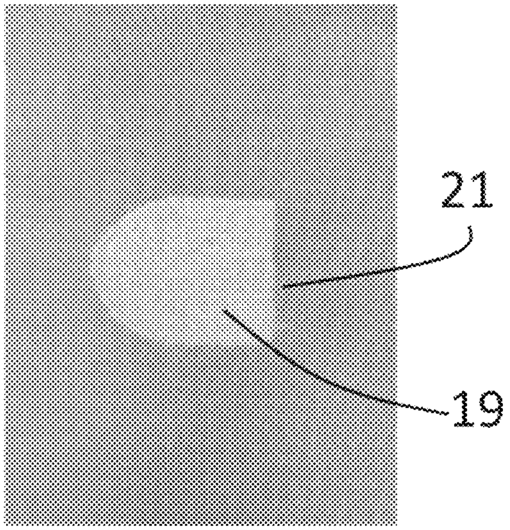

OPTICAL STRUCTURE HAVING A RELIEF EFFECT

CROSS REFERENCE TO RELATED APPLICATION

This is a national stage application of PCT/EP2020/087035, filed internationally on Dec. 18, 2020, which claims priority to French Application No. 1915373, filed on Dec. 20, 2019, both of which are incorporated by reference herein in their entireties.

The present invention relates to optical structures with relief effect, notably for secure documents and/or security elements, and the methods for manufacturing same.

It relates more particularly to the optical structures that bear liquid crystals.

Liquid crystals are widely used in optical structures, and notably security elements, for their goniochromatic properties.

Generally, the liquid crystals are deposited directly in contact with a polymer film, conventionally made of PET, previously stretched in at least one direction, even in two right-angled directions. The stretching of the film promotes the alignment of the liquid crystals, which thus confers on the optical structure an effect of change of color when there is a change of observation direction and/or of lighting direction.

To reinforce the visibility of the goniochromatic effect, a dark background, generally black, is disposed on the face of the support opposite that on which the liquid crystals are applied.

To the knowledge of the applicant, the liquid crystals thus applied are not currently used to obtain a relief effect, only a goniochromatic effect.

An optical structure with relief effect is for example known from US 2013/0288024 A1 that comprises a substrate coated with a first layer which is embossed and can be covered with a second layer, the first layer and/or the second layer comprising pigments with optical effect. The embossing is described as inducing optically detectable changes in the alignment of the pigments, which reinforces the 3D effect of the pattern defined by the embossed zone.

EP 2 886 343 A1 describes an optical structure comprising a substrate, a primer formed on the substrate and a UV-cross-linkable layer which is disposed on the primer. The UV-cross-linkable layer can comprise liquid crystals and is embossed, so as to obtain a three-dimensional visual effect. The assembly formed by the cross-linkable layer and the primer is surrounded by a dust-preventing coating.

The relief effects are obtained either by the production of dark images, formed by printing or a metallization or demetallization process, or by holographic structures.

The impression of relief given by a dark image is not dynamic, inasmuch as the appearance does not change, even very little, with the angle of observation. It is more spectacular with a holographic structure, but the manufacturing cost is relatively high.

There is consequently a need to benefit from new optical structures capable of obtaining a dynamic relief effect while being relatively simple and economical to produce.

The invention aims to address this need, and it achieves this by virtue of an optical structure with relief effect, comprising:

- a support suitable for aligning liquid crystals,
- a deposit in contact with the support of a substance in the form of at least one pattern partially covering the support, and
- a layer of liquid crystals at least partially covering the support and said pattern and in contact with the support.

Surprisingly, a relief visual effect can be obtained by virtue of the deposit situated between the support and the layer of liquid crystals. This deposit creates at least one transition zone delimited by the outline of the pattern, and extending at least partially around the latter, which appears, for at least one observation direction and/or one lighting direction, darker or lighter than a first zone in which the liquid crystals are superposed on, notably in contact with, the deposit, and than a second zone distinct from the first zone in which the liquid crystals are in contact with the support. The variation of contrast between the first and second zones on the one hand, and the transition zone, results in a relief visual effect for the observer of the optical structure.

A part of the transition zone can appear dark, notably matt, and another part of the transition zone can appear light, and notably have a specular gloss appearance.

In particular, when the optical structure is lit by means of a light radiation whose direction of incidence comprises a component parallel to the support, which is oriented from a first edge of the deposit toward an opposite second edge of the deposit, a part of the transition zone in contact with the second edge can have a specular gloss appearance, for example when observed from a direction normal to the support and vice versa. A part of the transition zone in contact with the first edge can appear dark.

The relief effect obtained is dynamic, inasmuch as the appearance, notably the relief impression, changes when the observation direction changes and/or the lighting direction changes. In particular, certain regions of the transition zone can pass from a matt and/or dark appearance to a light and/or glossy appearance, when the observation direction changes and/or the lighting direction changes.

The transition zone can have a width less than 1 mm, notably between 100 μm and 500 μm. It extends from an inner edge defined by the outline of the pattern to the second zone in which the relief effect is not observed. The width of the transition zone corresponds to the greatest measured, in a direction normal to the inner edge, between the inner edge and the part of the second zone closest to the inner edge.

The first zone and the second zone can each appear darker according to a first observation direction and/or according to a first lighting direction than according to a second observation direction and/or according to a second lighting direction respectively.

According to one observation direction, the first zone and the second zone can appear dark and the transmission zone can appear matt, and according to another observation direction, the first zone and the second zone can appear light and the transition zone can have a specular gloss appearance.

Moreover, the optical structure can have goniochromatic properties. In particular, the first zone, respectively the second zone, can appear in one color according to a first observation direction and/or according to a first lighting direction, and another color according to a second observation direction and/or according to a second lighting direction respectively. Furthermore, the transition zone can appear dark according to the first observation direction and/or according to the first lighting direction, and can have a specular gloss appearance according to the second observation direction and/or according to the second lighting direction respectively.

Observed according to the first observation direction and/or according to the first lighting direction, the first zone and the second zone can have different colors, and observed according to the second observation direction and/or according to the second lighting direction, the first zone and the second zone can have different colors.

As a variant, observed according to the first observation direction and/or according to the first lighting direction, the first zone and the second zone can have a same color, and observed according to the second observation direction and/or according to the second lighting direction, the first zone and the second zone can have different colors.

As a variant, observed according to the first observation direction and/or according to the first lighting direction, the first and second zones and the transition zone can have a same color, and observed according to the second observation direction and/or according to the second lighting direction, the first and second zones and the transition zone can have a same color.

Furthermore, observed according to the first observation direction and/or according to the first lighting direction, the color of the transition zone can be different from the color of the first zone and/or from the color of the second zone, and observed according to the second observation direction and/or according to the second lighting direction, the color of the transition zone can be different from the color of the first zone and/or from the color of the second zone.

Deposit

The relief effect is obtained according to the invention despite a small thickness of the deposit.

Preferably, the deposit is a print, notably of an ink or of a varnish.

Preferably, in order for the relief visual effect to be relatively pronounced, the dry weight of substance, expressed on the basis of the area of the face of the support covered by the deposit, is less than or equal to 1.5 g/m$^2$, preferably less than or equal to 1 g/m$^2$, even better between 0.1 g/m$^2$ and 0.5 g/m$^2$.

The substance can comprise less than 40% liquid crystals, as a percentage by weight expressed on the basis of the dry weight of the substance. The substance may not have liquid crystals.

The substance can comprise less than 40% liquid crystals, as a percentage by weight expressed on the basis of its weight.

The substance can be an ink or a varnish.

The varnish or the ink can be transparent or colorless in the visible range. The deposit can thus not generate opacity detectable to the naked eye in transmitted light.

The varnish or the ink can comprise a solvent. The solvent can be nonaqueous and comprise an alcohol and/or a polyol. As a variant, the solvent is aqueous.

The varnish or the ink can be hardenable under irradiation by a radiation, notably by a UV radiation.

The varnish or the ink can be applied by inkjet, flexography, screen printing or photogravure.

The deposit, notably when it is in the form of a varnish or an ink, can comprise components that are absorbent or that can be excited under illumination in the ultraviolet or in the infrared, in particular the near infrared.

In particular, the varnish or the ink can be colorless and transparent in the visible and comprise a luminescent component, notably a fluorescent component, which can be visible only under UV or IR illumination, preferably UV, and the support can be transparent or translucent. Thus, when it is observed in transmission, the optical structure appears for example transparent or translucent to the observer under lighting by means of an illuminant in the visible, the pattern being indiscernible from the support, and the pattern is revealed under lighting by means of an illuminant provoking the luminescence, notably an illuminant emitting in the UV.

Preferably, the substance is an ink, which facilitates the deposition thereof by an ink printing technique.

The ink can comprise nematic liquid crystals and the layer of liquid crystals at least partially covering the support can comprise cholesteric liquid crystals with goniochromatic effect. Advantageously, the pattern is polarized linearly and the layer of liquid crystals is polarized circularly. Thus, in addition to the relief effect, another optical effect is obtained.

When the structure is observed in polarized light according to a first observation configuration, the zone in which the pattern and the layer of cholesteric liquid crystals are superposed has a first appearance and the zone in which the layer of cholesteric liquid crystals is in contact with the support has a second appearance different from the first appearance.

Preferably, the appearance is a color.

Moreover, preferably, the zone in which the pattern and the layer of cholesteric liquid crystals are superposed and the zone in which the layer of cholesteric liquid crystals is in contact with the support each change appearance and have aspects that are different from one another according to a second observation configuration, the transition between the first and second observation configurations being made preferably by rotation of the optical structure about an axis normal to the support, preferably by an angle of 90°.

Preferably, the appearance of the zone in which the pattern and the layer of cholesteric liquid crystals are superposed in the first observation configuration is identical to the appearance of the zone in which the layer of cholesteric liquid crystals is in contact with the support in the second observation configuration, and vice versa.

The substance can be colored. It can have a same color or a color different from the color of the support.

The ink can be black, preferably pigmentary with a pigment concentration less than 10%. The ink preferably comprises a non-aqueous solvent and is intended to be deposited on the support by ink-jet printing. As a variant, it can also be deposited by a flexographic printing method.

The ink can be colored. It can be of light color. It can have a saturation difference with the support ΔC greater than 10, preferably greater than 15 and even better greater than 20. Such a saturation difference consists in concentrating the gaze of the observer toward the transition zone. The saturation difference is measured in the colorimetric space LCH defined according to the ISO 5631-1 standard.

Preferably, the ink comprises less than 10% pigments, notably colored, as a percentage by weight expressed on the basis of the dry weight of the ink. Preferably, the ink is not pigmentary. A non-pigmentary ink results in a particularly marked relief effect. Preferably, the ink comprises less than 10% pigments, notably colored, as a percentage by weight expressed on the basis of its weight.

Preferably, the ink comprises a solvent and a colorant dissolved in the solvent.

The ink can be intended for printing by means of an ink-jet printer. It can notably be of yellow color or of cyan color for an ink-jet printer.

The ink can comprise an aqueous base, which can represent between 60% and 90%, even between 65% and 85% of the volume of the ink. It can further comprise a polar solvent, for example pyrollidone-2. The polar solvent can represent less than 7.5% of the volume of the ink. It can comprise a plasticizer, for example pental-1,5-diol, which can represent less than 10% of the volume of the ink. It can also comprise dehydrated magnesium nitrate, which can represent less than 5% of the volume of the ink.

As a variant, the ink can comprise at least one polyol and/or one alcohol, which can represent more than 75% of the volume of the ink.

The polyol for example comprises from 2 to 32 carbon atoms, in particular from 2 to 16 carbon atoms, and notably between 3 and 8 carbon atoms. "Polyol" should be understood to be any organic molecule comprising at least two free hydroxyl radicals. In particular, the polyol can be chosen from among ethylene glycol, pentaerythritol, trimethylolpropane, propylene glycol, 1,3-propanediol, butylene glycol, isoprene glycol, pentylene glycol, hexylene glycol, glycerine, diglycerol, and the mixtures thereof. Preferably, the polyol is glycerine.

The alcohol can be chosen from among the lower $C_1$-$C_6$ alkanols, and in particular chosen from among ethanol, propanol and isopropanol. Preferably, the alcohol is ethanol.

The ink can comprise a surface active agent. The surface active agent can be chosen from among the amphoteric, anionic, cationic or non-ionic surface active agents, used alone or in a mixture. It can possibly be used with a co-surface active agent. In the case where the ink is an emulsion, the surface active agents are chosen appropriately according to the emulsion to be obtained (water-in-oil or oil-in-water). Preferably, the surface active agent is a non-ionic surface active agent. Examples of non-ionic surface active agents that can in particular be cited include the oxyethylene derivatives of tetramethyl-2,4,7,9 decyne-5 diol-4,7, and preferably tetramethyl-2,4,7,9 decyne-5 diol-4,7 oxyethylene with 3.5 moles of ethylene oxide, marketed under the name of Surfynol 440.

It can comprise a greasy substance to modify the alignment of the liquid crystals in the transition zone. "Fat" is understood to mean an organic compound that is insoluble in water at ambient temperature (25° C.) and at atmospheric pressure (760 mm of Hg), that is to say that has a solubility less than 5%, preferably than 1%, or even more preferably than 0.1%. The fat can be chosen from among the lower $C_6$-$C_{16}$ alkanes, the non-siliconized oils of animal, vegetable or synthetic origin, the hydrocarbons of mineral or synthetic origin, fatty alcohols, fatty acids, esters of fatty acid and/or of fatty alcohol, the non-siliconized waxes, and silicones.

Moreover, the ink can exhibit a surface tension, measured according to the ISO 304 standard, of between 28 mN/m and 32 mN/m.

For example, the substance is chosen from among:

- the black color ink marketed by the company Toyo Ink America under the reference LIOJET AP KB027-K intended for ink-jet printing by piezoelectric technology.
- the yellow color ink marketed by the company HP under the reference HP343 intended for printing with the HP Deskjet 6540 printer marketed by the company HP,
- the HP70 gloss enhancer varnish marketed by the company HP,
- the yellow ink marketed by the company HP under the reference HP304 for printing with the Envy 5030 printer marketed by the company HP,
- the yellow ink marketed by the company HP under the reference HP72 for printing with the T610 design jet printer marketed by the company HP,
- the yellow ink marketed by the company HP under the reference GT52 for printing with the GT5810 Deskjet printer marketed by the company HP,
- the nematic liquid crystal ink marketed by the company BASF under the reference Lumogen Hide N700.

The deposit can be non-opaque, in particulier transparent or translucent.

The deposit can be in the form of a solid color. The method for manufacturing the optical structure is thus simplified. A solid color can be produced simply on the support, for example by printing, notably by ink-jet printing, by flexography, by screen printing or by photogravure. The deposit can thus be other than in the form of a half-tone raster image.

The deposit is preferably produced by ink-jet printing. This method notably allows:

- the deposition of small quantities of substance per unit of surface area, and/or
- customization of the patterns without requiring any printing form.

The pattern can be continuous or discontinuous. It can be formed by portions of pattern spaced apart from one another. The adjacent portions of pattern can be spaced apart by a zone free of substance, preferably by a distance greater than 100 μm. Thus, at least one transition zone can be formed in the zone separating the spaced apart portions of pattern.

The pattern or at least a portion of the pattern can surround a zone free of substance. Preferably, the greatest dimension of said surrounded zone is greater than 100 μm.

The pattern can take the form of at least one alphanumeric symbol or can represent a logo, a person, an animal, a landscape, a plant, a monument, a texture or an object. It can represent one or more geometrical figures, for example polygons, ellipses or disks of different sizes. It can constitute a serial number. The same pattern can be located elsewhere on the document, to the same scale or to a different scale, being for example present on another security element or in the form of a print on the substrate of the secured document.

The pattern can have the largest dimension of between 0.5 and 30 mm.

The pattern can be repeated at regular intervals along the support.

Support

The support is suited to the alignment of the liquid crystals. In particular, it can have a surface texture suited to the alignment of the liquid crystals.

Preferably, the support comprises a film stretched axially or preferably bi-axially.

The film is produced in a plastic material, chosen from among a polyester, notably polyethylene terephthalate, also called PET, polypropylene, polyethylene and the mixtures thereof. The film is preferably made of PET.

The stretching promotes the alignment of the liquid crystals.

The film can have a thickness of between 6 μm and 500 μm. For example, it has a thickness of between 12 μm and 50 μm, for example approximately 19 μm.

The support can also comprise a layer of a primer, notably an adhesion primer, which covers, preferably entirely, one face of the film and is in contact with the film and with the layer of liquid crystals. The adhesion primer increases the adhesion of the liquid crystals to the support without preventing the film from contributing through its intrinsic structure to the alignment of the liquid crystals.

The thickness of the adhesion primer is preferably less than 1000 nm, preferably less than 100 nm. Thus, the structure of the underlying film remains active to promote the alignment of the liquid crystals during the manufacturing of the optical structure.

The adhesion primer is preferably transparent.

The adhesion primer can comprise a polyolefin, preferably chosen from among polyethylene, polyurethane, polyester, polycarbonate and polyacrylic, one of the copolymers thereof. Preferably, it comprises a polyacrylic.

The support is for example chosen from among the Sarafil® S56C and Sarafil® SF150 polyester supports marketed by the company TPL, a transparent polyester support marketed by the company Technifilm, a transparent polyester support chosen from the Lumirror® range marketed by the company Toray, and a transparent polyester support marketed by the company Mitsubishi.

Preferably, the support can be chosen such that the reflection haze of the layer formed by the liquid crystals in contact with the support, measured according to ASTM D4039-09 standard, is greater than 50, notably between 50 and 100, and preferably greater than 60, notably between 60 and 90.

The "reflection haze" measured according to the ASTM D4039-09 and ISO13803 standards, characterizes the reflection scattering haze effect of the layer of liquid crystals. A reflection scattering haze causes a milky appearance, linked to a light scattering of low intensity alongside the main reflection, which corresponds to the reflection in the specular direction. The measurement can be performed according to the ASTM D4039-09 (reapproved 2015) or ISO 13803: 2014 standard. That allows a visibility over a more extended angular range of the goniochromatic effect and consequently a masking of the background over a more extended angular range. The optical structure can thus be disposed in a through window formed in a substrate. The goniochromatic effect of the layer of liquid crystals and/or the relief effect can thus be observed, notably without the optical structure being disposed between the observer and a dark background.

Preferably, the support comprises a film and an adhesion primer as described above, the adhesion primer being chosen such that the reflection haze of the layer formed by the liquid crystals in contact with the support, measured according to the ASTM D4039-09 standard, is greater than the reflection haze of a layer of liquid crystals disposed in contact with the film alone, not covered by the adhesion primer.

Moreover, the support can be transparent or translucent. The relief effect can be observed from the front and the back of the support.

Preferably, the zones of the structure that appear visually as protruding when the front side of the optical structure is observed in reflection, appear as depressions when the back side of the optical structure is observed in reflection.

Moreover, in order to enhance the durability of the optical structure, an additional support, preferably comprising PET, can be fixed to the film provided with the optical structure by any appropriate means, notably by lamination by means of an adhesive. Preferably, the additional support is fixed onto the face of the film coated by the adhesion primer.

The film can be of polypropylene, notably bi-oriented, also called BOPP film. Such a film of polypropylene is for example marketed under the name Guardian by the company CCL Secure or under the tradename Safeguard by the company De La Rue. The adhesion primer is for example marketed by the company Mica Corporation under the reference Mica-A-131-X.

Liquid Crystals

The layer of liquid crystals can be in contact with the deposit.

The liquid crystals have at least one goniochromatic property. They can be nematic, or preferably cholesteric. The layer of liquid crystals can comprise nematic liquid crystals and cholesteric liquid crystals.

The liquid crystals are preferably non-thrombocytic.

The layer of liquid crystals is preferably cross-linked. It can be obtained by printing with a cross-linkable ink containing liquid crystals followed by drying and then a cross-linking of the ink, notably under UV, in order to fix the alignment of the liquid crystals.

Preferably, the reflection haze of at least a part of the layer of liquid crystals superposed on the deposit and the reflection haze of at least a part of the layer of liquid crystals in contact with the support, measured according to the ASTM D4039-09 standard, is greater than the reflection haze of the transition zone.

The layer of liquid crystals can at least partially, even totally, cover the face of the support on which it is disposed.

The thickness of the layer of liquid crystals can be less than 100 μm, notably between 2 μm and 30 μm.

Moreover, the optical structure can have microcavities, formed between the layer of liquid crystals and the support, notably between the layer of liquid crystals and the deposit of said substance.

The largest dimension of each microcavity, measured in the plane of the support, is notably less than 100 μm.

Preferably, the thickness of the optical structure is constant, for example between 14 μm and 55 μm. The thickness of the layer of liquid crystals in at least one zone where it is in contact with the support is preferably equal to the sum of the thicknesses of the deposit, of any microcavities, and of the layer of liquid crystals, in the zone where the layer of liquid crystals is superposed on the deposit.

The liquid crystals preferably have a lesser alignment quality, in a zone directly covering the support, than in the transition zone. Since the liquid crystals are better aligned in the transition zone, the reflection of the light is observed only for particular observation directions and/or lighting directions. For these particular observation directions and/or lighting directions, it is more intense there than in the first and second zones.

The alignment quality of the liquid crystals in a zone of the optical structure can be measured by acquiring an image of a surface of predetermined area by optical microscopy in polarized or non-polarized light. Individual zones, called "domains", in which the liquid crystals have substantially a same alignment, are observed on the image. The smaller the size of the domains, that is to say the greater their number in a zone of given area, the lower the alignment quality of the liquid crystals in said zone. For example, it is possible to evaluate the alignment quality of the liquid crystals in a zone by acquiring, by spectroscopy, the light spectrum transmitted across the zone. The profile of the light spectrum transmitted across the zone depends on the alignment of the liquid crystals in said zone.

The alignment quality of the liquid crystals in the transition zone can be uniform.

The measurement of the width of the transition zone can be performed by means of an image of the optical structure acquired by optical microscopy in polarized light or, as a variant, in unpolarized light, by determining the expanse in which the alignment quality of the liquid crystals is uniform and better than in the adjacent zones.

The optical structure can comprise at least one other layer of liquid crystals which contains liquid crystals that are different from the layer of liquid crystals covering the deposit. In particular, the layer of liquid crystals and the other layer of liquid crystals can have different goniochromatic properties.

The layer of liquid crystals and the other layer of liquid crystals can be partially superposed on one another, in order to define zones, notably three zones, with different goniochromatic properties.

In one embodiment, the optical structure can comprise:

a translucent, or preferably transparent, support a first deposit of a first substance in contact with a first face of the support in the form of a first pattern, a second deposit of a second substance in contact with a second face of the support in the form of a second pattern, the first and second faces of the support being opposite one another, first and second layers of liquid crystals at least partially covering the first and second faces of the support respectively and being superposed on, notably in contact with, the first and second patterns respectively.

When the optical structure is observed in transmitted light, the first and second patterns can complement one another by association, thus defining a third pattern. This third pattern can be located elsewhere on the document or another security element, to the same scale or to a different scale.

Moreover, when observed in reflection on either one of the first and second faces, the relief visual effects generated by the first and second sets each formed by the support, the first and second deposits and the first and second layer of liquid crystals can be combined with one another.

The optical structure can comprise a dark background which can be provided under the layer of liquid crystals, notably on the side of the support opposite the side covered by the layer of liquid crystals. The dark background reinforces the relief effect and, if necessary, the goniochromatic effect of the liquid crystals.

As a variant, the layer of liquid crystals can be sandwiched between the support and the dark background. The deposit and the layer of liquid crystals can thus be protected by the support and by the dark background.

The dark background can be obtained by printing a colorant, for example Indanthren PA-FS from Dystar Colours Distribution or a pigment, notably a metal oxide. The pigment can for example be absorbent or interferential.

As a variant, the dark background can be obtained by metallization, notably in a vacuum or by electrochemical means, or by any other technique for depositing a metal, a metal oxide or a metal oxide salt. The dark background can also be borne by the additional support, which is preferably fixed to the support on the side opposite the side coated by the layer of liquid crystals.

A metallized layer comprising apertures passing through the thickness thereof, obtained for example by demetallization, can be deposited on the face of the support opposite the face of the support on which the layer of liquid crystals is deposited. As a variant, said metallized layer can also be borne by the additional support, which is preferably fixed to the support on the side opposite the side coated by the layer of liquid crystals.

The dark background can be covered with magnetic particles disposed in such a way that the magnetic remanence of the optical support varies along the dark background, thus defining a third level of security, for example a magnetic code.

Preferably, the dark background is superposed at least partially on the layer of liquid crystals.

The dark background is preferably disposed in a registered way with respect to the layer of liquid crystals; in particular, the dark background can be superposed exactly on the liquid crystals.

The dark background can have a transmission rate less than 80%, and is preferably opaque.

In a variant, the optical structure has no dark background, notably as described above.

The optical structure can be present on a security element, for example chosen from among a security wire, a security foil, a security film or a security patch.

The invention relates also to a security element comprising an optical structure according to the invention.

The security element can comprise at least one additional security structure, notably chosen from among the first, second or third level security structure. It can involve:

patterns appearing in transmitted light and formed by metallization and/or demetallization, colorants, luminescent pigments, interferential pigments, in printed form or mixed with at least one constituent layer of the security element, compounds, colorants and/or photochromic or thermochromic pigments, notably in printed form or mixed with at least one constituent layer of the security element, ultraviolet (UV) absorber, notably in coated form or mixed with at least one constituent layer of the security element, interferential multilayer structure, a refractive, birefringent or polarizing layer, a diffraction structure, means producing a "moiré effect" or a parallax effect, such an effect being for example able to reveal a pattern produced by the superposition of two security means, for example by the convergence of lines of two security means, notably by folding, a colored filter.

an automatically-readable security measure, having specific and measurable characteristics, notably of luminescence (for example fluorescence, phosphorescence), of light absorption (for example ultraviolet, visible or infrared), of Raman activity, of magnetism, of microwave interaction, of interaction with X-rays or of electrical conductivity. Security element.

The security element can be chosen from among a security wire, a security foil, a security film or a security patch. It can even be a card or protection or antitamper film. The security element can comprise several optical structures according to the invention.

The security element can be a security wire and the pattern is repeated, preferably regularly at regular intervals in the longitudinal direction of the wire.

In the variant in which the security element is a security wire, the security wire can be incorporated in windows in a secure document such as a bank note. The security element can then extend from one edge to the other of the document.

The security wire can have a width of between 1 mm and 10 mm and/or a thickness of between 10 μm and 100 μm.

In the variant in which the security element is a foil, the security element is applied by transfer onto the surface of a paper, a film or a card for example.

"Patch" denotes a film which does not cover the entire surface of the underlying substrate.

The invention relates also to a security document comprising an optical structure according to the invention and/or a security element according to the invention.

Preferably, the optical structure is visible on the front and on the back of the document. In particular, the zones of the optical structure appearing to protrude when the front of the document is observed can appear as depressions when the back of the document is observed.

The secure document can comprise a fibrous substrate and the security element is disposed in a window in the fibrous substrate.

The secure document can be chosen from among a payment means, such as a bank note, a check or a luncheon voucher, an identity document, such as an identity card, a visa, a passport or a driving license, a lottery ticket, a transport document and a ticket to a cultural or sport event.

The security element can extend from one edge to the other of the secure document.

The pattern of the optical structure can be located elsewhere on the secure document and thus establish a link between the secure document and the security element. Preferably, in a variant in which the secure document is a banknote, the pattern represents, for example, the currency, the name of the bank or the denomination value.

Manufacturing Method

The invention relates also to a method for manufacturing an optical structure according to the invention, in which the substance is deposited on the support to form at least one pattern partially covering the support, and at least one layer of liquid crystals is deposited on the support and the duly formed pattern.

Prior to the deposition of the substance on the support, the method can comprise the stretching of the element in at least one direction.

The method can comprise, prior to the deposition of the substance, the deposition of a primer, notably an adhesion primer, on a film, as described above, in order to form the support.

The deposition of the substance can be performed by printing on the support, notably by ink-jet printing, photogravure, screen printing, typography or flexography.

Preferably, the substance is an ink. The deposition can be made by means of an ink-jet printer comprising a cartridge containing the ink or a continuous ink supply means. The ink-jet printer can be a piezoelectric ink-jet printer or a thermal ink-jet printer.

Preferably, the inking ratio of the support is greater than 20%. The inking ratio of the support corresponds to the ratio of the volume of the ink deposited by the printer on a zone of the support to the maximum volume of the ink that can be printed on the zone of the support.

After printing, the coated support can be dried for a time less than or equal to 5 min, for example for 1 min, and/or at a temperature of between 50° C. and 100° C., for example of approximately 60° C.

The support can be fixed to a substrate, notably a paper, during the printing of the pattern. For example, the substrate comprises a recess and the pattern is printed on the portion of the support superposed on the recess.

The layer of liquid crystals can be printed on the support and on the pattern by flexography, screen printing, photogravure or typography, notably by means of an ink comprising a solvent and the liquid crystals dispersed in the solvent. It can be printed by ink jet. The ink can be deposited in the form of a solid color or of a pattern which covers at least the pattern and the support in its portion not covered by the pattern.

The liquid crystals are aligned during the evaporation of the solvent, for example by "airborne" drying, preferably horizontally to promote the alignment of the liquid crystals. Preferably, the ink is cross-linkable under UV, and the cross-linking which follows the deposition makes it possible to permanently fix the alignment of the liquid crystals.

The evaporation can be implemented in an oven for a time of between 1 min and 5 min, for example for 3 min, and/or at a temperature of between 50° C. and 100° C., for example of approximately 95° C.

The invention relates lastly to a method for authenticating a security element according to the invention or a secure document according to the invention, in which the optical structure is observed according to at least one observation direction and a determination is made from this observation as to whether the pattern appears giving the impression of a relief image.

In particular, the optical structure can be observed in at least two different observation directions on a same side of the support, and a change of appearance of the pattern or around the pattern can be sought to be detected when the angle of observation varies, notably a change of appearance consistent with the observed relief effect. The optical structure can be observed, notably according to a same observation direction, by lighting it according to two different lighting directions on a same side of the support and a change of appearance of the pattern or around the pattern can be sought to be detected when the lighting angle varies, notably a change of appearance consistent with the observed relief effect.

The observation of the pattern can be performed in front of a dark background, in order to amplify the relief visual effect.

Moreover, an observation can be made on the front and on the back, and a reversal of the relief between the observation is sought to be detected. Reversal of the relief is understood to mean that the zones that appear to protrude when one face of the optical structure is observed appear to be depressed when the opposite face is observed, and vice versa.

Moreover, the authentication of the security element can comprise the observation of the optical structure to determine whether a goniochromatic effect is observed and the generation of information concerning the authenticity on the basis at least of this observation.

The authentication method can comprise the observation of the security element through a polarizing filter to reveal the orientation of the support and the step consisting in generating information concerning the authenticity on the basis at least of this observation. The observation through the polarizing filter can reveal the difference in alignment quality of the liquid crystals between the transition zone and the first and second zones.

For example, according to the variant in which the support comprises a bi-oriented film, the bi-orientation of the film can be checked by analyzing the birefringence of the film, in a conventional way. A linear polarizer can be used, such as a filter to be placed on the security element, that is turned by 90° to determine if there is a change from a dark appearance to a lighter appearance in turn.

In the variant described according to which the ink comprises nematic liquid crystals and the layer of liquid crystals at least partially covering the support comprises cholesteric liquid crystals with goniochromatic effect, the method can further comprise the observation of the optical structure in polarized light in order to detect a difference of appearance between the zone in which the pattern and the layer of cholesteric liquid crystals are superposed and the zone in which the layer of cholesteric liquid crystals is in contact with the support.

Preferably, the optical structure is moved and/or turned, notably about an axis normal to the support, preferably by an angle of 90°, in order to detect a change of appearance of the zone in which the pattern and the layer of cholesteric liquid crystals are superposed and the zone in which the layer of cholesteric liquid crystals is in contact with the support, the change of appearance being also such that the appearances of the zone in which the pattern and the layer of cholesteric liquid crystals are superposed and the zone in which the layer of cholesteric liquid crystals is in contact with the support are also different from one another.

According to a preferred variant of the authentication method described above, the polarized light is emitted by an LCD screen for example of a telephone or of a computer. Thus, the authentication of the security element or of the secured document is implemented simply, for example, by positioning the security element or the secure document between the LCD screen and the observer.

The invention will be able to be better understood on reading the following description of nonlimiting examples of implementation thereof, and on studying the attached drawing in which FIG. 1 schematically represents a top view of an example of an optical structure according to the invention, FIG. 2 represents a cross section on I-I of FIG. 1, FIGS. 3*a-d* illustrate different relief visual effects observed for different lighting directions, FIG. 4 is a cross section of a variant element, FIG. 5 is a cross section of another variant embodiment, FIG. 6 is a cross section of another variant embodiment, FIG. 7 represents a front view of a secure document according to the invention, FIG. 8 is a cross section of another example of a secure document, FIG. 9 is a photograph of an example of PET coated with an ink deposit, FIG. 10 is a photograph of an example of an optical structure produced from the coated film of FIG. 9, FIG. 11 is a photomontage of halves of the photographs of FIGS. 10 and 11 according to a same scale, FIG. 12 is a photograph acquired in optical microscopy in polarized light of a part of the optical structure of FIG. 11.

FIG. 13 is a photograph of another example of coated film performing an optical structure, FIG. 14 is a photomontage of a photograph of the optical structure produced from the coated film of FIG. 13 and of a corresponding part of the photograph of FIG. 13, FIG. 15*a* is a photograph of the front of an example of an optical structure, FIG. 15*b* is a photograph of the back of the optical structure of FIG. 15*a*, FIG. 16*a* is a photograph of an example optical structure lit according to a lighting direction, FIG. 16*b* is a photograph of the optical structure of FIG. 16*a* lit according to another lighting direction, FIG. 16*c* is a photomontage comprising the left and right portions respectively of the photographs of FIGS. 16*a* and 16*c* and a central portion corresponding to the central portion of FIGS. 16*a* and 16*c* not coated by the layer of liquid crystals, FIG. 17*a* is a photograph of an example of optical structure observed in non-polarized light, FIG. 17*b* is a photograph of the optical structure of FIG. 17*a* observed in polarized light, and FIG. 17*c* is a photograph of the optical structure of FIG. 17*a* observed in polarized light after rotation by 90° about an axis normal to the support.

In the figures, the constituent elements of the structure are not necessarily represented to scale, in the interests of clarity.

FIGS. 1 and 2 illustrate an example of an optical structure 5 according to the invention, which comprises a support 7, a deposit 9 of a substance on the support to form a pattern 11, and a layer of liquid crystals 13.

The substance is for example an ink printed on the support by means of a thermal or piezoelectric ink-jet printer. It partially covers the face 15 of the support on which it is deposited. In the example of FIGS. 1 and 2, the pattern has a circular form, but any other form can be considered, for example a series of alphanumeric symbols, notably a currency, a landscape, a person or a monument.

The deposit 9 is in contact with the support 7 and the layer of liquid crystals.

When observed according to at least one observation direction $D_1$, the optical structure has a relief visual effect, notably in a transition zone 17 delimited by the pattern 11 and extending around the pattern. In the transition zone 17, the layer of liquid crystals can be in contact with the support 7. The transition zone 17 extends between a first zone 19 in which the liquid crystals are superposed on, notably in contact with, the substance of the deposit 9 and a second zone 21 in which the liquid crystals are in contact with the support 7. The alignment quality of the liquid crystals in the transition zone 17 can thus be different from the alignment quality of the liquid crystals in the first 19 and second 21 zones.

When the optical structure is lit by means of the light radiation $E_{1g}$ which comprises a component, parallel to the support, oriented from the left edge 23 toward the opposite right edge 25 of the deposit 9, a part 27 of the transition zone in contact with the right edge, delimited by the broken lines in FIG. 3*a*, can appear light, and notably have a specular glossy appearance. A part of the transition zone 29 in contact with the left edge, delimited schematically by broken short lines in FIG. 3*a*, can appear dark, and notably matt.

When the optical structure is lit by means of the light radiation $E_{2g}$, oriented like the radiation $E_{1g}$ from the left edge 23 toward the right edge 25 of the deposit 9, and having an incidence, with respect to the support, different from the light radiation $E_{1g}$, the part 27 of the transition zone appears light as illustrated in FIG. 3*b*, the appearance being able to be different from that observed in FIG. 3*a*, and the appearance of the part 29 of the transition zone has changed with respect to that observed by means of the lighting $E_{1g}$. Notably the part 29 appears lighter than when lit according to the direction $E_{1g}$. In particular, it can have a specular glossy appearance.

Moreover, the first 19 and second 21 zones can have goniochromatic effects, which can be substantially identical, when lit by means of the light radiations $E_{1g}$ and $E_{2g}$.

When the optical structure is lit by means of the light radiations $E_{1d}$ and $E_{2d}$ oriented in directions opposite to the radiations $E_{1g}$ and $E_{2g}$, that is to say from the right edge 25 toward the left edge 23 of the deposit, the observed effects are reversed, as illustrated schematically in FIGS. 3*c* and 3*d*. The part 27 of the transition zone appears dark and the part 29 appears light when lit according to the direction $E_{1d}$, and the part 27 appears lighter when lit according to the direction $E_{2d}$.

The optical structure can comprise a dark background 31, as illustrated in FIG. 4. The dark background can take the form of an opaque layer 33, covering the face 35 of the support opposite the face 15 in contact with which the deposit and the layer of liquid crystals are disposed. The opaque layer is, for example, a print of a black ink or a metallization. It is superposed at least partly with the deposit and the layer of liquid crystals. Thus, when observed on the side of the support where the liquid crystals are disposed as indicated by the arrow D2, the visibility of the liquid crystals is improved and the relief effect is amplified.

As a variant, as illustrated in FIG. 5, the dark background 31 is disposed on the opposite side of the support which is translucent, or preferably transparent. It is in contact with the layer of liquid crystals 13. The dark background 31 and the support 7 sandwich the layer of liquid crystals and the deposit. Thus, the relief effect is amplified when the optical structure is observed on the side of the support opposite the side coated by the deposit, as indicated by the arrow $D_3$.

The example illustrated in FIG. 6 differs from that illustrated in FIG. 4 in that the optical structure comprises another transparent film 37, for example made of PET, which is fixed, for example pasted, on the semi-opaque dark background. The optical structure also comprises a metalized layer 39 provided with at least one recess 41, produced for example by selective demetallization and opening through to the other film 37. Thus, the optical structure provides a relief visual effect when observed on the side of the support coated with the layer of liquid crystals and the deposit. It obtains another visual effect, when observed on the other side of the support, the metalized layer having a glossy appearance according to at least one direction, and the dark background being discernible through the recess or recesses.

FIG. 7 represents a secure document 45, in the form of a banknote, comprising a fibrous substrate 47, for example made of paper, and a security element 49 in the form of a security wire extending in window(s) between two edges 53, 55 of the substrate 47. The security wire comprises a part inserted into the mass of the substrate, represented by broken lines, and another part disposed in a window 57 appearing on the surface of the fibrous substrate 47. The security wire contains the optical structure, the deposit 9 being disposed in the window 57. The pattern 11 can be located elsewhere on the document, for example in an identical form 58.

FIG. 8 represents another example of a secure document 45, in the form of a banknote, comprising a fibrous substrate 47, for example made of paper, and a security element 49 in the form of a security film extending between two edges 53, 55 of the substrate 47 and at least partially covering an opening 60 passing right through the thickness of the substrate 47. The security film contains the optical structure, the deposit 9 being at least partially, for example totally, superposed on the opening 60. The pattern 11 can be located elsewhere on the document, for example in an identical form 58.

The optical structure can comprise a background, as illustrated in FIGS. 4 and 5. As a variant, as represented in FIG. 8, the optical structure can be as according to the example illustrated in FIG. 1 and the secure document can be disposed facing a standalone dark background 31 to amplify the relief visual effect.

EXAMPLES

Example 1

A film of Sarafil S56C reference polyester PET marketed by the company Polyplex was chosen. It has a surface texture suitable for the alignment of the liquid crystals. The Sarafil S56C film is a bi-stretched film coated with a co-polyester-based adhesion primer.

Several optical structures were produced by forming deposits of a yellow ink or of a cyan ink by ink-jet printing on a face of the film.

The yellow ink has the reference C8766[Y] and is printed by means of an HP6540 reference ink-jet printer. The cyan ink has the reference C8766[C] and is printed by means of an HP6540 reference ink-jet printer.

Prints are produced with different inking rates and, for each deposit, the dry weight of the ink deposit is measured by weighing. Table 1 summarizes the results of these measurements, and those of the measurements of the color of the film alone and of each deposit, in accordance with the ISO 5631-1 standard. It also mentions the saturation difference ΔC and the clarity difference ΔL between the support film and the deposit. The values C* and L* correspond to the values of the measurements of saturation and of clarity of the deposits and of the uncoated film.

TABLE 1

| | Inking rate | Deposited dry weight (g/m$^2$) | L* | C* | h | ΔL | ΔC |
|---|---|---|---|---|---|---|---|
| Film | 0% | 0 | 89.5 | 4.8 | 113.8 | / | / |
| Yellow | 20% | 0.10 | 89.3 | 13.3 | 105.7 | −0.2 | 8.5 |
| | 60% | 0.40 | 87.3 | 48.2 | 99.1 | −2.2 | 43.4 |
| | 100% | 0.80 | 85.4 | 71.2 | 94.5 | −4.1 | 66.4 |
| Cyan | 20% | 0.05 | 84.6 | 10.6 | 195.5 | −4.9 | 5.8 |
| | 60% | 0.25 | 75.0 | 30.0 | 211.2 | −14.5 | 25.2 |
| | 100% | 0.80 | 63.2 | 50.4 | 218.0 | −26.3 | 45.6 |

The various coated samples were then dried for 5 minutes at a temperature of 60° C.

Moreover, the samples of film coated with the different deposits are printed with an ink with liquid crystals with 576 nm yellow/green goniochromatic effect marketed by the company BASF under the reference Lumogen S ink 6525T.

The deposition of the liquid crystal ink is performed to a thickness of between 2 and 3 microns to the coating bar. The liquid crystals were then aligned during the drying of the ink under blown hot air then set by UV cross-linking.

The most accentuated relief visual effects were observed for the deposits having an inking rate of at least 60%.

FIGS. 9 to 16 are photographs illustrating the relief effects obtained for different optical structures comprising deposits of yellow ink with an inking rate of 60%.

FIG. 9 is a photograph of a zone of a Sarafil S56C film coated with a deposit of yellow ink forming a rosette pattern on the Sarafil S56C film and FIG. 10 is a photograph of the same zone coated by the layer of liquid crystals. The zone has a height of 10 mm and a width of 13 mm. As can be seen, the contours 59 of the pattern appear in relief. Transition zones are defined around each portion of the pattern. Parts $\mathbf{17}_1$ of the transition zones 17 appear dark and matt while others $\mathbf{17}_2$ appear light and glossy, visually suggesting a print of depth.

FIG. 12 is a photograph acquired by optical microscopy in non-polarized light of a part of the optical structure, in which a transition zone 17 with a width of approximately 300 μm extends between a first zone 19 in which the ink is in contact with the support and a second zone 21 in which the liquid crystals are in contact with the support. The analysis by optical microscopy in non-polarized light informs on the alignment of the liquid crystals. Thus, the density of the domains informs on the alignment of the liquid crystal or crystals imaged. As can be seen in FIG. 12, domains 18*a-c* are observed, within which the alignment of the liquid crystals varies little. The size of the domains is different between the transition zone and the first and second zones. In other words, the number of domains per unit of surface area is different between the transition zone and the first and second zones. It appears notably that the domains are of greater dimensions in the zone 17, which indicates that the alignment quality of the crystals is better there than in the first and second zones.

The deposit photographed in FIG. 13 is discontinuous and defines a pattern in the form of an animal. A relief visual effect is observed, as observed in FIG. 14, which, by superimposing the photograph of the optical structure with that of the support coated with just the deposit, makes it possible to view precisely the position of the transition zones, notably with respect to the contour of the patterns.

FIG. 15*a* is a photograph of another example of an optical structure, seen from a front side of the support and FIG. 15*b* is a photograph of the optical structure seen from the opposite back side of the support. The transition zones that appear in relief on the back side appear depressed on the front side and vice versa.

A dynamic effect appears, illustrated by means of the photographs presented in FIGS. 16*a-c*.

An example of an optical structure lit according to a first direction is photographed in FIG. 16*a*. The component of the lighting direction in the plane of the support is oriented from the bottom to the top of the page of FIG. 16. Portions $\mathbf{17}_1$ of the transition zones extending around the edges of the printed patterns oriented downward appear dark and portions $\mathbf{17}_2$ around the edges of the same patterns oriented upward appear bright. Moreover, the first 19 and second 21 zones have different colors, notably slightly different.

When it is lit according to a second direction different from the first direction, the visual appearance of the optical structure changes. The portions of the transition zones which appear dark, respectively bright, in FIG. 16*a*, appear bright, respectively brighter, in FIG. 16*b*. Moreover, an effect of change of color is observed in the first and second zones. They have two color hues that vary gradually yellow green according to the angle of observation and/or of illumination.

Example 2

A film of Sarafil S56C reference polyester PET marketed by the company Polyplex was chosen. It has a surface texture suited to the alignment of the liquid crystals. The Sarafil S56C film is a bi-stretched film coated with a co-polyester-based adhesion primer.

An optical structure was produced by forming a deposit of a black ink by ink-jet printing on a face of the film.

The black ink has the reference Liojet AP-KB027-K and is printed by means of a Kyocera KJ4B-1200 reference piezoelectric print head.

The duly coated film was then dried for 5 minutes at a temperature of 60° C.

Moreover, the coated film was printed with an ink with liquid crystals with 576 nm yellow/green goniochromatic effect marketed by the company BASF under the reference Lumogen S ink 6525T.

The deposition of the liquid crystal ink was performed to a thickness of between 2 and 3 microns, to the coating bar. The liquid crystals were then aligned during the drying of the ink under blown hot air then set by UV cross-linking.

A black ink was deposited on the back of the coated film in order to serve as dark background to augment the visibility of the liquid crystals.

An intense relief effect was obtained by authentication of the face printed with the liquid crystals.

Example 3

A film of Sarafil S56C reference polyester PET marketed by the company Polyplex was chosen. It has a surface texture suited to the alignment of the liquid crystals. The Sarafil S56C film is a bi-stretched film coated with a co-polyester-based adhesion primer.

An optical structure was produced by forming a deposit of a black ink by flexographic printing on a face of the film.

The black ink has the reference Liojet AP-KB027-K. Its viscosity was modified by the addition of 0.35% of a cellulosic derivative marketed by the company Shin Etsu under the reference Tylose HS100000YP2. The application was performed by means of a Flexiproof 100 flexographic applicator from the company Rk Print.

The duly coated film was then dried for 5 minutes at a temperature of 60° C.

Moreover, the coated film was printed with an ink having liquid crystals with 576 nm yellow/green goniochromatic effect marketed by the company BASF under the reference Lumogen S ink 6525T.

The deposition of the liquid crystal ink was performed to a thickness of between 2 and 3 microns, to the coating bar. The liquid crystals were then aligned during the drying of the ink under blown hot air then set by UV cross-linking.

A black ink was deposited on the back of the coated film in order to serve as dark background to augment the visibility of the liquid crystals.

An intense relief effect was obtained by authentication of the face printed with the liquid crystals.

Example 4

A film of Sarafil S56C reference polyester PET marketed by the company Polyplex was chosen. It has a surface texture suited to the alignment of the liquid crystals. The Sarafil S56C film is a bi-stretched film coated with a co-polyester-based adhesion primer.

An optical structure was produced by forming a deposit of an ink comprising nematic liquid crystals by ink-jet printing on a face of the film.

The ink has the reference Lumogen Hide N700 and is printed by photogravure.

The duly coated film was then dried for 5 minutes at a temperature of 105° C. to align the liquid crystals. The alignment was then set by UV cross-linking.

Moreover, the coated film was printed with an ink with liquid crystals with 576 nm yellow/green goniochromatic effect marketed by the company BASF under the reference Lumogen S ink 6525T.

The deposition of the liquid crystal ink was performed to a thickness of between 2 and 3 microns, to the coating bar. The liquid crystals were then aligned during the drying of the ink under blown hot air, then set by UV cross-linking.

An intense relief effect was obtained by authentication of the face printed with the liquid crystals, as can be seen in FIG. 17*a*.

Moreover, the optical structure was placed between an LCD screen and an observer in order to detect another optical effect in polarized light. As a variant, an unpolarized light source and a polarizing filter can be used. The optical structure can be placed between the unpolarized light source and the polarizing filter and the observer can look at the optical structure through the polarizing filter.

As can be seen in FIG. 17*b*, according to a first configuration of observation of the optical structure, the zone 19 in which the pattern comprising the nematic crystals and the layer of cholesteric liquid crystals are superposed has a blue color and the zone 21 in which the cholesteric liquid crystals are in contact with the support has a pink color.

After rotation of the optical structure by 90° with respect to the support, a change appearance of each of the zones 19 and 21 is observed, in the form of a reversal of colors. The zone 19 has a pink color and the zone 21 has a blue color.

The invention is not limited to the examples described.

In particular, the invention is also suitable for producing coatings or decorative objects.

When the invention is applied to the production of security documents, the optical structure according to the invention can be present on security elements other than a security wire.

It is very particularly advantageous for the pattern of the optical structure to be located elsewhere on the document, in an identical form or to a different scale, or in any other recognizable form, the observer being able to recognize the link that exists between the pattern of the structure and that which appears elsewhere.

The invention claimed is:

1. An optical structure with relief effect, comprising:

a support suitable for aligning liquid crystals;

a pattern comprising an ink or a varnish that is deposited on the support in a liquid state and then dried, wherein the pattern is free of liquid crystals and has a dry weight of 1.5 $g/m^2$ or less; and a layer of liquid crystals disposed on the support and at least partially covering the pattern, the layer of liquid crystals comprising:

a first zone directly covering the pattern;

a transition zone delimited by the contour of the pattern and extending around the pattern; and a second zone in which the liquid crystals are in contact with the support, the second zone being distinct from the first zone and the transition zone, wherein the transition zone has a lower number of liquid crystal domains per unit of surface area than the first zone and the second zone, with a domain being defined as a region in which the liquid crystals have substantially a same alignment, with the alignment being different from an alignment of liquid crystals of adjacent regions.

2. The structure of claim 1, wherein the pattern is transparent and colorless in the visible range.

3. The structure of claim 1, wherein the pattern comprises the ink.

4. The structure of claim 1, wherein the pattern is a solid color.

5. The structure of claim 1, wherein the support is transparent or translucent.

6. The structure of claim 1, wherein the support comprises an axially stretched plastic film.

7. The structure of claim 6 further comprising an adhesion primer layer disposed between the film and the layer of liquid crystals.

8. The structure of claim 1, wherein a portion of the liquid crystals directly contact the pattern.

9. A security element comprising the optical structure of claim 1.

10. A secure document comprising the optical structure of claim 1.

11. The document of claim 10, wherein the optical structure is visible on a front side and an opposing back side of the document.

12. The document of claim 10, wherein:

the document comprises a fibrous substrate having a window; and the optical structure is comprised by a security element disposed in the window.

13. A method for manufacturing an optical structure with a relief effect, the method comprising:

depositing an ink or varnish that is free of liquid crystals on a support in a liquid state and then drying the ink or varnish to form a pattern on the support, the pattern having a dry weight of 1.5 $g/m^2$ or less; and depositing a layer of cholesteric liquid crystals on the pattern and the support, the cholesteric liquid crystals being configured to produce a goniochromatic effect, the layer of liquid crystals comprising:

a first zone directly covering the pattern;

a transition zone delimited by the contour of the pattern and extending around the pattern; and a second zone in which the liquid crystals are in contact with the support, the second zone being distinct from the first zone and the transition zone, wherein the transition zone has a lower number of liquid crystal domains per unit of surface area than the first zone and the second zone, with a domain being defined as a region in which the liquid crystals have substantially a same alignment, with the alignment being different from an alignment of liquid crystals of adjacent regions.

14. The method of claim 13, wherein:

the depositing of the ink comprises printing the ink on the support; and the depositing of the liquid crystal layer comprises inkjet printing, flexography, screen printing, photogravure, or typography.

15. A method for authenticating the security element of claim 12, the method comprising observing the optical structure through the window to determine whether the pattern appears as a relief image.

16. The method of claim 15, wherein the observing the optical structure comprises observing the optical structure from at least two different observation directions from a same side of the support, in order to determine whether the appearance of the pattern changes.

17. The method of claim 15, wherein the observing the optical structure comprises observing the optical structure from opposing sides of the support, in order to determine whether the pattern appears as reversed relief images.

18. The method of claim 15, wherein the observing the optical structure comprises observing polarized light radiated onto the optical structure, in order to determine whether first portion of the cholesteric liquid crystals that contact the pattern and a second portion of the cholesteric liquid crystals that contact the support have different appearances.

19. The method of claim 18, further comprising moving the optical structure, in order to determine whether there is a change in the appearances of the first portion of the cholesteric liquid crystals and the second portion of the cholesteric liquid crystals.

20. The method of claim 19, wherein the polarized light is emitted by a liquid crystal display screen.

* * * * *